US007455045B2

(12) United States Patent
Sugiyama et al.

(10) Patent No.: US 7,455,045 B2
(45) Date of Patent: Nov. 25, 2008

(54) FLUID FLOW CONTROL DEVICE FOR INTERNAL COMBUSTION ENGINE

(75) Inventors: Fumiyasu Sugiyama, Osaka (JP); Takafumi Ninomiya, Kusatsu (JP)

(73) Assignee: Aisan Kogyo Kabushiki Kaisha, Obu-Shi, Aichi-ken (JP)

(*) Notice: Subject to any disclaimer, the term of this patent is extended or adjusted under 35 U.S.C. 154(b) by 0 days.

(21) Appl. No.: 11/828,611

(22) Filed: Jul. 26, 2007

(65) Prior Publication Data

US 2008/0029061 A1 Feb. 7, 2008

(30) Foreign Application Priority Data

Aug. 1, 2006 (JP) ............................. 2006-210213
Aug. 1, 2006 (JP) ............................. 2006-210221

(51) Int. Cl.
*F02D 9/16* (2006.01)
*F16K 1/22* (2006.01)

(52) U.S. Cl. ...................................... 123/337; 251/305

(58) Field of Classification Search ................. 123/337, 123/188.3; 251/305, 368, 304, 306
See application file for complete search history.

(56) References Cited

U.S. PATENT DOCUMENTS 5,184,478 A * 2/1993 Kutsuna et al. ............... 62/468
6,257,217 B1 * 7/2001 Yamazaki et al. ........ 123/188.3
2004/0000601 A1 1/2004 Niwa
2007/0012803 A1 * 1/2007 Shimizu et al. ............. 239/497

FOREIGN PATENT DOCUMENTS

| | | |
|---|---|---|
| JP | 07 197017 | 8/1995 |
| JP | 08 014069 | 1/1996 |
| JP | 08 246163 | 9/1996 |
| JP | 09 013179 | 1/1997 |
| JP | 09 112392 | 4/1997 |
| JP | 10 025469 | 1/1998 |
| JP | 10 220254 | 8/1998 |
| JP | 10 273617 | 10/1998 |
| JP | 11 116945 | 4/1999 |
| JP | 11 315994 | 11/1999 |
| JP | 2002 004984 | 1/2002 |
| JP | 2004 028051 | 1/2004 |
| JP | 2004 084499 | 3/2004 |
| JP | 2004 100478 | 4/2004 |

* cited by examiner

*Primary Examiner*—Willis R Wolfe, Jr.
(74) *Attorney, Agent, or Firm*—Dennison, Schultz & MacDonald

(57) ABSTRACT

An intake apparatus 100 includes a bore 102 and a throttle valve 104. A coating film 110 in which a lipophilic component and an oil-repellent component are dispersed is formed on at least one of an outer peripheral end surface **104*a* of the throttle valve 104 and a facing surface 102*a* of the bore 102 which faces the throttle valve 104**.

18 Claims, 6 Drawing Sheets

FLUID FLOW CONTROL DEVICE FOR INTERNAL COMBUSTION ENGINE

BACKGROUND OF THE INVENTION

1. Field of the Invention

The present invention relates to a fluid flow control device for controlling the amount of fluid flow for the internal combustion engine.

2. Description of the Related Art

Recently, there has been a growing need for increased fuel efficiency (reduced fuel consumption) of an internal combustion engine, and in order to meet this need, various methods have been studied. One of these methods has been proposed to reduce the amount of air which may leak when the throttle valve for opening and closing an air passage for air supply is in a completely closed position, in order to improve fuel efficiency during idling of the internal combustion engine. Japanese laid-open patent publication No. 8-14069 discloses an intake apparatus in which a coating film having an non-stick properties is formed on at least one of an outer peripheral end surface of a throttle valve and a portion of an inner peripheral surface of an air passage which faces the throttle valve.

The coating film used in the known intake apparatus has an non-stick properties against oil drops. However, once an oil drop sticks to the surface of the coating film, the sticking oil drop may form the core of deposit buildup. Therefore, it is necessary to allow for deposit buildup in determining a clearance between the throttle valve and the inner peripheral surface of the air passage. In this case, when the throttle valve is in the completely closed position, air leaks through the clearance between the throttle valve and the inner peripheral surface of the air passage. Therefore, the known technique can provide only a limited improvement in fuel efficiency during idling of the internal combustion engine. Further, prevention of deposit buildup is desired not only in the intake apparatus for an internal combustion engine, but in various other fluid flow control devices provided in a fluid passage through which fluid for the internal combustion engine flow.

SUMMARY OF THE INVENTION

Accordingly, it is an object of the present invention to provide an effective technique for preventing deposits from being formed and built up by oil or other substance contained in fluid in a fluid flow control device for controlling the amount of fluid flow for an internal combustion engine.

In a first aspect of the present invention, a fluid flow control device for an internal combustion engine includes a fluid passage through which fluid for the internal combustion engine flows, and a valve that opens and closes the fluid passage. The fluid passage is formed in the substrate. Further, the substrate forms the valve. The fluid for the internal combustion engine includes various kinds of fluid, such as air to be supplied to the internal combustion engine and combustion gas to be exhausted from the internal combustion engine. The fluid passage and the valve which are appropriate to respective kinds of fluid are used. For example, an air passage formed in a throttle body and a throttle valve for opening and closing the air passage are used.

In this aspect, in order to prevent buildup of deposits in the region of the valve, a coating film in which an oil-repellent component and a lipophilic component are dispersed is formed on the surface of the substrate. As the oil-repellent component, fluorine resins such as tetrafluoroethylene copolymer (TEFC), polytetrafluoroethylene (PTFE) and perfluoroalkoxyalkane (PFA) can be used. As the lipophilic component, silicone resin (such as denatured organo polysiloxane), inorganic silicon oxide ($SiO_2$), methyl group modified polymer (such as polypropylene (PP)), metal (such as nickel, cobalt, manganese) and metal oxide can be used.

The coating film is formed on at least one of a portion of an inner peripheral surface of the fluid passage which faces the valve and a portion of an outer peripheral surface of the valve which faces the inner peripheral surface of the fluid passage. It is preferable that the coating film is formed in a region adjacent to and including an area of contact of the valve and the inner peripheral surface of the fluid passage. However, it is essential for the coating film to be formed at least on the area of contact of the valve and the fluid passage and also to be formed on at least one of the outer peripheral surface of the valve and the inner peripheral surface of the fluid passage which contact each other.

In the coating film, an oil-repellent component may be used as its base and a lipophilic component may be dispersed in the oil-repellent component. Alternatively, a lipophilic component may be used as the base and an oil-repellent component may be dispersed in the lipophilic component.

In the composite coating film in which the oil-repellent component and the lipophilic component are dispersed, oil drops on the surface of the coating film are attracted downward along the surface of the coating film by the attracting power of the lipophilic component, while being repelled away from the surface of the coating film by the repelling power of the oil-repellent component. Such a coating film that provides an attracting power of a lipophilic component and a repelling power of an oil-repellent component is called as a "hybrid coating film". Therefore, oil drops readily slide down along the surface of the coating film without staying on the film surface. Thus, buildup of deposits in the region of the valve can be prevented.

The lipophilic component and the oil-repellent component can be appropriately selected. Preferably, silicon resin may be used as the lipophilic component and fluorine resin may be used as the oil-repellent component. In order to obtain the coating film having excellent resistance to acid and alkali, it is preferable to form the coating film by using fluorine resin as its base and dispersing silicone resin in the base.

In order to enhance the attracting operation of the lipophilic component and the repelling operation of the oil-repellent component, it is preferable to form a plurality of recesses on the surface of the coating film. The recesses can have an appropriately selected shape, such as a groove-like or hole-like shape. With these recesses, the surface of the coating film is made uneven, so that the surface area of the coating film increases. As a result, the attracting operation of the lipophilic component and the repelling operation of the oil-repellent component are enhanced, and thus the oil sliding property of the coating film can be further improved.

In order to send oil drops flying away from the surface of the coating film, it is preferable to form the recesses into a circular arc shape in section. With this configuration, a turbulent flow is produced within the recesses by an air flow through the fluid passage. The turbulent flow produced within the recesses sends oil drops flying away from the surface of the coating film. In this regard, preferably, the shape of the recesses may be selected such that the turbulent flow can be easily produced within the recesses.

Alternatively, the substrate and the coating film may be utilized to cause the attracting power of a lipophilic component and the repelling power of an oil-repellent component to act upon oil drops. For example, the substrate may be made of one of a lipophilic component and an oil-repellent component and the coating film may be made of the other of a lipophilic component and an oil-repellent component and formed on the substrate.

In a second aspect of the present invention, a substrate is made of an oil-repellent component, and a coating film is made of a lipophilic component and formed on the surface of the substrate. Further, a plurality of recesses are formed in the surface of the coating film such that the substrate is exposed at the recesses. In this arrangement, the attracting power of the lipophilic component of the coating film and the repelling power of the oil-repellent component of the substrate which is exposed at the recesses formed in the coating film act upon the oil drops on the surface of the coating film.

In a third aspect of the present invention, a substrate is made of a lipophilic component, and a coating film is made of an oil-repellent component and formed on the surface of the substrate. Further, a plurality of recesses are formed in the surface of the coating film such that the substrate is exposed at the recesses. In this arrangement, the repelling power of the oil-repellent component of the coating film and the attracting power of the lipophilic component of the substrate which is exposed at the recesses formed in the coating film act upon the oil drops on the surface of the coating film.

In the second and third aspects, the same lipophilic and oil-repellent components as in the first aspect can be used. Further, the same area as in the first aspect can be selected to form the coating film on the surface of the substrate. Specifically, the coating film can be formed on at least one of a portion of an inner peripheral surface of the fluid passage which faces the valve and a portion of an outer peripheral surface of the valve which faces the inner peripheral surface of the fluid passage.

In the second and third aspects, the oil sliding property can be enhanced by the repelling power of the oil-repellent component and the attracting power of the lipophilic component. Moreover, the oil sliding property can also be enhanced by the uneven surface of the coating film.

The shape of the recesses can be appropriately selected. In order to send oil drops flying away from the surface of the coating film, it is preferable to form the recesses into a circular arc shape in section.

Further, in order to cause the oil drops to slide (move) in a specified direction, it is preferable to arrange the extending direction of the plurality of recesses in parallel to each other. With this parallel arrangement, the coating film and the substrate exposed at the recesses are arranged in alternating stripes on the surface. In this arrangement, the sliding (moving) direction of the oil drops is preferably designed to intersect with the extending direction of the recesses.

Alternatively, a plurality of coating films can also be used to cause the repelling power of the oil-repellent component and the attracting power of the lipophilic component to act upon the oil drops. For example, two layers of a coating film (inner coating film) made of one of an oil-repellent component and a lipophilic component and a coating film (outer coating film) made of the other of the oil-repellent component and the lipophilic component are formed on the surface of the substrate. Then, a plurality of recesses are formed in the outer coating film such that the inner coating film is exposed at the recesses.

In a fourth aspect of the present invention, two layers of a coating film (inner coating film) made of an oil-repellent component and a coating film (outer coating film) made of a lipophilic component are used, and a plurality of recesses are formed in the coating film (outer coating film) made of the lipophilic component such that the coating film (inner coating film) made of the oil-repellent component is exposed at the recesses formed in the coating film (outer coating film) made of the lipophilic component.

Further, in a fifth aspect of the present invention, two layers of a coating film (inner coating film) made of a lipophilic component and a coating film (outer coating film) made of an oil-repellent component are used, and a plurality of recesses are formed in the coating film (outer coating film) made of the oil-repellent component such that the coating film (inner coating film) made of the lipophilic component is exposed at the recesses formed in coating film (outer coating film) made of the lipophilic component.

In the fourth and fifth aspects as well, the shape of the recesses can be appropriately selected.

The first to fifth aspects are preferably constructed as an intake apparatus including a fluid passage through which fluid for the internal combustion engine flows and a valve that opens and closes the fluid passage.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide improved fluid flow control devices. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention.

Figure 1:
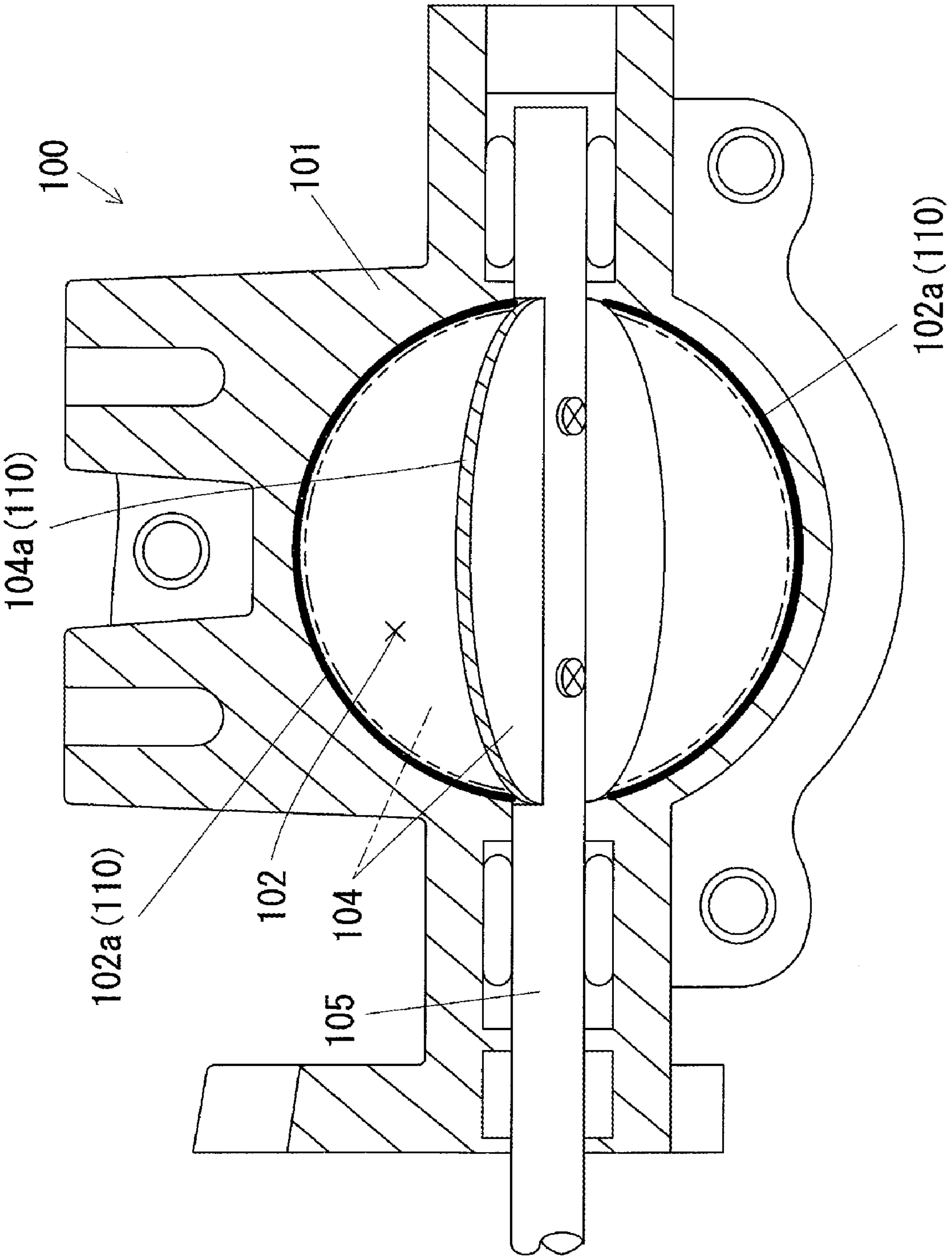
FIG. 1 is a sectional view of an intake apparatus.

FIG. 1 shows an intake apparatus 100 as a representative example of a fluid flow control device for an internal combustion engine according to a first embodiment of the present invention.

The "internal combustion engine" includes various kinds of engines, such as a gasoline engine and a diesel engine.

The intake apparatus 100 shown in FIG. 1 supplies air to the internal combustion engine. The intake apparatus 100 is a feature that corresponds to the "fluid flow control device for an internal combustion engine" according to the present invention.

The intake apparatus 100 includes a throttle body (also referred to as a "valve housing") 101 having a bore (air passage) 102 through which air flows, and a throttle valve (also referred to as a "butterfly valve") that opens and closes the bore (air passage) 102. The throttle valve 104 is rotatably supported on the throttle body 101 by a valve shaft 105. An actuator (not shown) is connected to the valve shaft 105 and serves to control the amount of opening of the throttle valve 104. By controlling the amount of opening of the throttle valve 104, the flow rate of air to be supplied to the internal combustion engine is controlled. An electric actuator or a diaphragm actuator may be used as the actuator.

The throttle body 101 comprises a substrate 103 (see FIGS. 2 to 5) made of metal, such as iron, iron alloy (carbon steel, special steel, heat-resistant steel, stainless steel, etc.), copper, copper alloy, nickel, nickel alloy, cobalt and cobalt alloy. The throttle valve 104 comprises a substrate 103 (see FIGS. 2 to 5) made of ferritic stainless steel or austenitik stainless steel.

The bore 102 and the throttle valve 104 are features that correspond to the "fluid passage" and the "valve", respectively, according to the present invention.

In this embodiment, in order to enhance the fuel efficiency (or to reduce the fuel consumption) of an internal combustion engine, the amount of air leakage which is caused when the throttle valve 104 is in a completely closed position is reduced, so that fuel consumption during idling of the internal combustion engine is reduced. Specifically, a coating film 110 having an excellent oil sliding property is formed on at least one of a portion of the outer peripheral surface of the throttle valve 104 which faces the inner peripheral surface of the bore 102 and a portion of the inner peripheral surface of the bore 102 which faces the throttle valve 104. With the coating film 110 of this embodiment, unlike with the known coating film having an non-stick properties, oil drops readily slide down without staying on the surface of the coating film 110.

The "portion of the outer peripheral surface of the throttle valve 104 which faces the inner peripheral surface of the bore 102" means an area of contact with the inner peripheral surface of the bore 102. Specifically, the coating film 110 is formed in an area which contacts the inner peripheral surface of the bore 102. Of course, the coating film 110 can also be formed in a region which includes the area of contact with the inner peripheral surface of the bore 102. In this embodiment, the coating film 110 is formed on an outer peripheral end surface 104_a_ (see FIG. 1) of the throttle valve 104.

The "portion of the inner peripheral surface of the bore 102 which faces the throttle valve 104" means an area of contact with the outer peripheral surface of the throttle valve 104. Specifically, the coating film 110 is formed in an area which contacts the outer peripheral surface of the throttle valve 104. Of course, the coating film 110 can also be formed in a region which includes the area of contact with the outer peripheral surface of the throttle valve 104. In this embodiment, the coating film 110 is formed on a facing surface 102_a_ (see FIG. 1) of the bore 102 including the area of contact with the outer peripheral end surface 104_a_ of the throttle valve 104.

The outer peripheral end surface 104_a_ of the throttle valve 104 and the facing surface 102_a_ of the bore 102 are features that correspond to the "portion of the outer peripheral surface of the valve which faces the inner peripheral surface of the fluid passage" and the "portion of the inner peripheral surface of the fluid passage which faces the valve", respectively, according to this invention.

Figure 2:
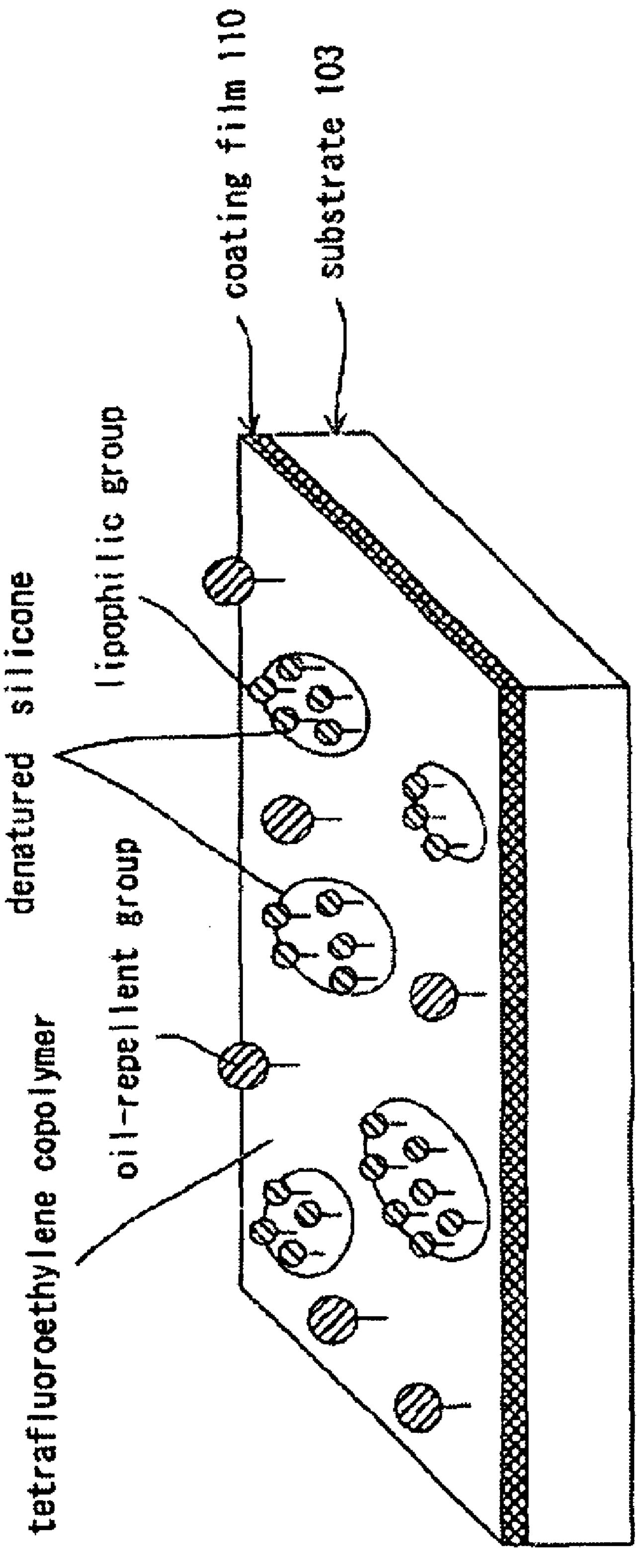
FIG. 2 schematically shows the state of a first embodiment of the coating film.

FIG. 2 schematically shows the state of the coating film 110 in the present embodiment. The state of the coating film 110 on the substrate 103 which forms the outer peripheral end surface 104_a_ of the throttle valve 104 is the same as that on the substrate 103 which forms the facing surface 102_a_ of the bore 102

As shown in FIG. 2, in the coating film 110 of the first embodiment, tetrafluoroethylene copolymer which is an oil-repellent component (involving an oil-repellent group) is used as a base, and denatured silicone which is a lipophilic component (involving a lipophilic group) is dispersed in the oil-repellent component. Alternatively, lipophilic denatured silicone may be used as the base and oil-repellent tetrafluoroethylene copolymer may be dispersed in the lipophilic component. Or an oil-repellent component and a lipophilic component may be mixed together in advance. Thus, the composite coating film 110 in which the oil-repellent component and the lipophilic component are dispersed is obtained.

The following method can be used to form the coating film 110. A main material forming the coating film 110 is obtained either by using an oil-repellent component as its base and dispersing a lipophilic component in the base or by using a lipophilic component as its base and dispersing an oil-repellent component in the base. Aliphatic polyisocyanate as a curing agent, organosilane as an adhesion improver (a silane coupling agent), and a ketone solvent (acetone, butyl acetate, etc.) as a solvent are mixed into the main agent. This liquid mixture is applied to the substrate by dipping or spraying and then cured under the sintering conditions of the temperature of 180° C. for 15 minutes. As a result, the substrate and the liquid mixture are bound together by silane coupling, so that the coating film 110 having a substantially uniform thickness is formed on the surface of the substrate. The thickness of the coating film 110 can be, for example, on the order of 1 μm or less.

Such a coating film has both the functions of the oil-repellent component and the lipophilic component and is thus called as a "hybrid coating film". The coating film 110 is a feature that corresponds to the "coating film in which an oil-repellent component and a lipophilic component are dispersed" according to the present invention.

Figure 3:
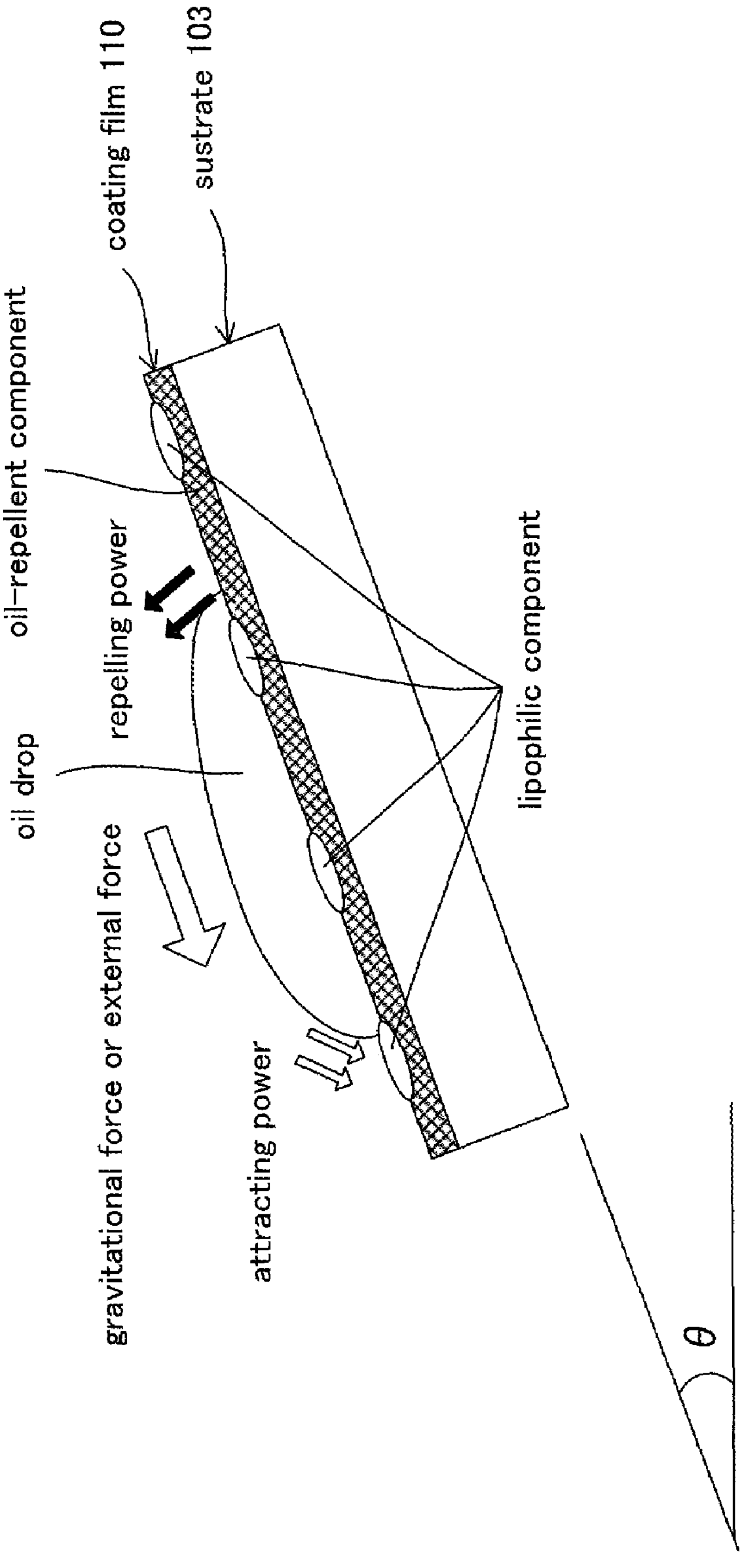
FIG. 3 schematically shows the mechanism of oil sliding on the first embodiment of the coating film.

FIG. 3 shows the mechanism of oil sliding on the coating film 110.

As shown in FIG. 3, the mechanism of oil sliding on the coating film 110 is based on the oil-repellent component and the lipophilic component of the coating film 110. The lipophilic component of the coating film 110 provides an attracting power of attracting oil drops to the surface of the coating film 110. Further, the oil-repellent component of the coating film 110 provides a repelling power of repelling oil away from the surface of the coating film 110. Specifically, the composite coating film 110 formed by dispersing the oil-repellent component and the lipophilic component always exerts the attracting power and the repelling power upon oil drops on the surface of the coating film 110.

Thus, when the inclination (the angle θ in FIG. 3) of the substrate is equal to or larger than the sliding angle (the sliding angle $\geqq\theta$), oil drops on the surface of the coating film 110 are repelled away by the repelling power of the oil-repellent component. At the same time, the oil drops are attracted downward along the surface of the coating film 110 by gravitational force or external force and by the attracting power of the lipophilic component. At this time, all of the oil drops (oil films) slide down along the surface of the coating film 110 without staying on the film surface. The "oil sliding angle" is the inclination angle of the surface at which an oil drop starts sliding down on the surface.

On the contrary, on the known coating film formed only of either an oil repellant component or a lipophilic component, oil drops receive only either a repelling power or an attracting power. Thus, the oil drops on the coating film do not move unless acted upon by a force (such as gravitational force and inertial force) which can overcome the repelling power or the attracting power. Therefore, the known coating film cannot exhibit an excellent oil sliding property.

Further, as the oil-repellent component of the coating film 110, not only tetrafluoroethylene copolymer (TEFC), but other fluorine resins such as polytetrafluoroethylene (PTFE) and perfluoroalkoxyalkane (PFA) can also be used. As the lipophilic component of the coating film 110, not only denatured silicone, but silicone resin (such as denatured organo polysiloxane), inorganic silicon oxide ($SiO_2$), methyl group modified polymer (such as polypropylene (PP)), metal (such as nickel, cobalt, manganese) and metal oxide can also be used.

By using the coating film 110 of this embodiment, buildup of deposits in the region of the throttle valve 104 can be prevented. For example, even if air (intake air) containing oil contacts the surface of the coating film 110 formed on or around the throttle valve 104, the oil readily slides down along the surface of the coating film 110, without staying on the film surface, by gravitational force or by the external force generated by an air flow within the bore 102. Thus, oil does not stay on the surface of the coating film 110, so that buildup of deposits in the region of the throttle valve 104 can be prevented.

As preventing buildup of deposits in the region of the throttle valve 104, the throttle valve 104 can be prevented being locked, and fluctuations of the flow rate can be reduced.

Further, as preventing buildup of deposits in the region of the throttle valve 104, a clearance between the throttle valve 104 and the bore 102 can be narrowed. As a result, the amount of air leakage which is caused when the throttle valve 104 is in a completely closed position can be reduced, so that the fuel efficiency can be improved (or the fuel consumption can be reduced) during idling of the internal combustion engine.

Inventors measured the oil sliding angle in order to quantitatively evaluate the effectiveness of use of the coating film 110 of this embodiment. The measurements were made on the coating film 110 of this embodiment, a coating film A made of tetrafluoroethylene copolymer which is an oil-repellent component and a coating film B made of silicon resin which is a lipophilic component. In the measurements, first, oil drops were dropped on each of the coating films formed on a substrate and the substrate was gradually inclined. Then, the inclination angle (the angle θ in FIG. 3) of the substrate at which each of the oil drops started moving (sliding down) on the surface of the coating film was measured as the oil sliding angle.

In the measurements, the oil sliding angle of the coating film A was 70° or larger, and the oil sliding angle of the coating film B was 30° to 50°. In either case, some oil drops were left on the surface of the coating film. While, in contrast, the oil sliding angle of the coating film 110 of this embodiment was 15° or smaller, and no oil films were left on the surface of the coating film. This shows that the coating film 110 of this embodiment can substantially enhance oil sliding property while preventing oil drops (oil films) from staying on the surface of the coating film.

Next, inventors measured the relation between the oil sliding angle and the mix proportion of denatured silicone to tetrafluoroethylene copolymer in the coating film 110 of this embodiment. The measurement results show that, when the mix proportion of denatured silicone to tetrafluoroethylene copolymer is set within the range of 0.02 to 50 wt % (weight percent), the coating film 110 can exhibit an excellent oil sliding property while preventing oil films from being left on the surface of the coating film 110. More preferably, the mix proportion of denatured silicone to tetrafluoroethylene copolymer may be set within the range of 0.1 to 10 wt %. When the mix proportion is set within this range, the oil sliding angle is kept stable in the order of 10° regardless of the mix proportion, so that oil films can be particularly effectively prevented from being left on the surface of the coating film 110. As one example, the mix proportion 1 wt % (tetrafluoroethylene copolymer 99 wt % and denatured silicone 1 wt %) can be used.

In this embodiment, the substrates 103 of the throttle valve 104 and the throttle body 101 are coated with the coating film 110 so as to be prevented from being exposed to the bore 102. Thus, the throttle valve 104 can be protected from corrosion by condensed water. Fluorine resins such as tetrafluoroethylene copolymer have excellent resistance to acid and alkali. Therefore, with the coating film formed by using an oil-repellent component such as tetrafluoroethylene copolymer as its base and dispersing a lipophilic component such as silicone resin in the oil-repellent component, the throttle valve 104 can also be protected from corrosion by acid and alkali. As a result, a malfunction of the throttle valve 104 can be prevented.

As described above, the oil sliding property can be enhanced by using the coating film 110 of this embodiment. The oil sliding property can be further improved. In order to further enhance the oil sliding property, in this embodiment, the surface of the coating film is uneven (preferably has a indented pattern). FIGS. 4 to 7 show first to fourth embodiments of the coating film.

FIRST EMBODIMENT OF THE COATING FILM

The coating film 110 shown in FIG. 4 (first embodiment of the coating film) is formed in the following manner. First, a plurality of grooves 103*a* are formed parallel to each other on the surface of the substrate 103. Then, the coating film 110 having a substantially uniform thickness is formed on the surface of the substrate 103 which has the grooves 103*a*. The thickness of the coating film 110 can be, for example, 1 μm or less. Thus, the surface of the coating film 110 has the same contour as the substrate 103. That is, a plurality of grooves 110*a* which have the same shape as the grooves 103*a* of the substrate 103 and are likewise extending parallel to each other are formed on the surface of the coating film 110.

Figure 4:
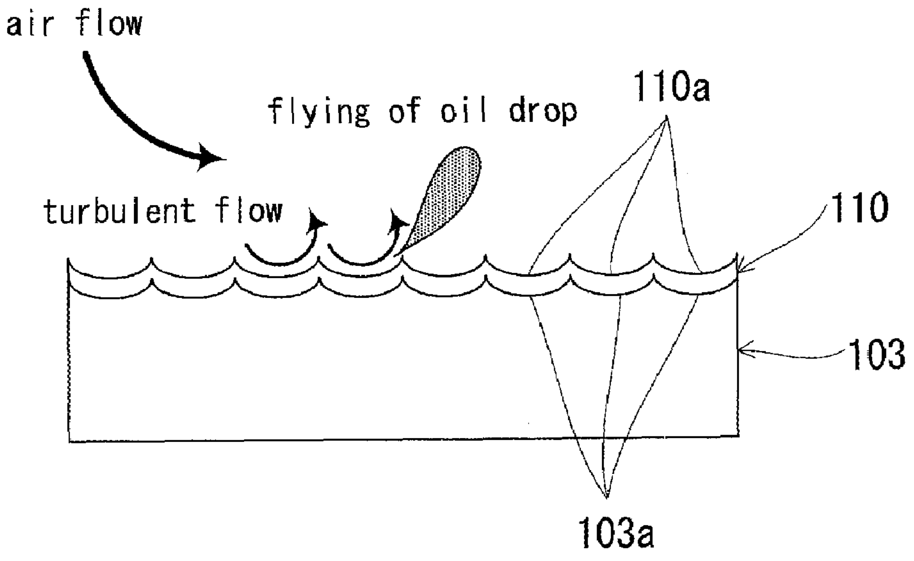
FIG. 4 is a sectional view showing the first embodiment of the coating film.

Preferably, the grooves 110*a* may be formed into a circular arc shape as viewed in section taken at right angles to the extending direction (longitudinal direction) of the grooves 110*a* (see FIG. 4). Further, preferably, the circular grooves 110*a* may have a depth of 100 to 400 nm, a width (in the lateral direction as viewed in FIG. 4) of 100 to 800 nm, and surface roughness of about 0.7 μm. With this configuration, a turbulent flow is produced within the grooves 110*a* by an air flow produced around the throttle valve 104. The turbulent flow produced within the grooves 110*a* sends oil drops and contamination flying away from the surface of the coating film 110.

Preferably, the grooves 103*a* of the substrate 103 may be typically formed as periodic microstructure grooves (an assembly of uniformly fabricated grooves) by laser processing such as femtosecond laser processing. The femtosecond laser processing is a method of fabricating a periodic structure on a material surface by scanning the material surface as overlapping a femtosecond laser beam. The femtosecond laser beam is an ultra-short pulse having a pulse width of several to several hundreds of femto seconds (femto second=$10^{-15}$) and has an ultra-intense. The femtosecond laser processing is a known technique and thus will not be described in further detail.

The grooves 110*a* formed by laser processing typically has a depth of ¹⁄₁₀ to ½ of the laser wavelength and has a width smaller than the laser wavelength.

The indented pattern on the surface of the coating film 110 is formed by forming the parallel grooves 110*a* on the surface of the coating film 110. Thus, the surface area of the coating film 110 increases. Due to the increased surface area of the coating film 110, the oil-drop attracting operation of the lipophilic component and the oil-drop repelling operation of the oil-repellent component are enhanced. Therefore, compared with a flat coating film without the grooves 110*a* on the surface of the coating film, the oil sliding property of the coating film can be improved.

Further, in the present embodiment, the direction of air flow (the direction perpendicular to the plane of the paper in FIG. 1 and the lateral direction in FIG. 4) is designed to intersect with the extending direction of the grooves 110*a*. For example, on the surface of the coating film 110 formed on the outer peripheral end surface 104*a* of the throttle valve 104 and the facing surface 102*a* of the bore 102, the grooves 110*a* are formed parallel to each other in a direction that intersects with the direction of air flow. Preferably, the extending direction of the grooves 110*a* is designed generally perpendicular to the direction of air flow.

SECOND EMBODIMENT OF THE COATING FILM

Figure 5:
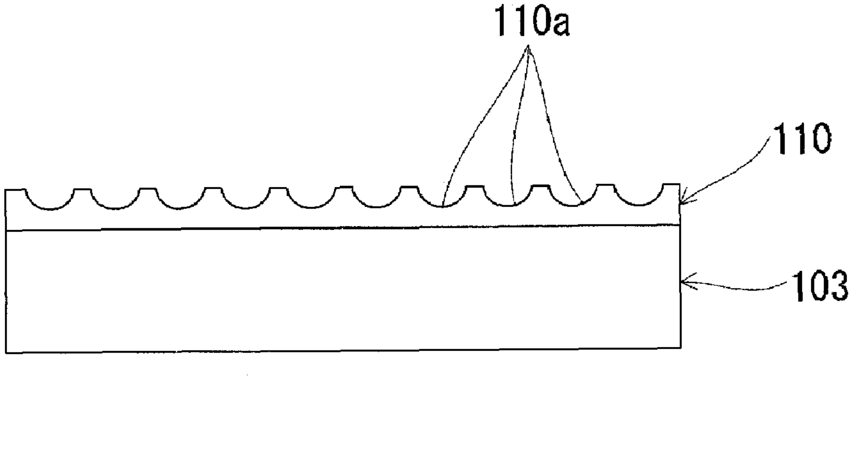
FIG. 5 is a sectional view showing a second embodiment of the coating film.

The coating film 110 shown in FIG. 5 (second embodiment of the coating film) is formed in the following manner. First, the coating film 110 having a substantially uniform thickness is formed on the surface of the substrate 103. Then, a plurality of grooves 110*a* are formed on the surface of the coating film 110 by laser processing such as femtosecond laser processing. Thus, an indented pattern is formed on the surface of the coating film 110. The grooves 100*a* have the same shape as in the first embodiment. Like in the first embodiment, the oil sliding property can also be enhanced by using the coating film 110 of the second embodiment.

THIRD EMBODIMENT OF THE COATING FILM

In the above first and second embodiments of the coating film, the coating film 110 in which the oil-repellent component and the lipophilic component are dispersed is formed on the surface of the substrate in order to cause the repelling power of the oil-repellent component and the attracting power of the lipophilic component to act upon oil drops at all times. However, other methods may be used for this purpose. For example, a substrate can be made of one of an oil-repellent component and a lipophilic component, and a coating film can be made of the other of the oil-repellent component and the lipophilic component. In this arrangement, the component of the substrate and the component of the coating film provide the repelling power and the attracting power to act upon oil drops at all times.

Figure 6:
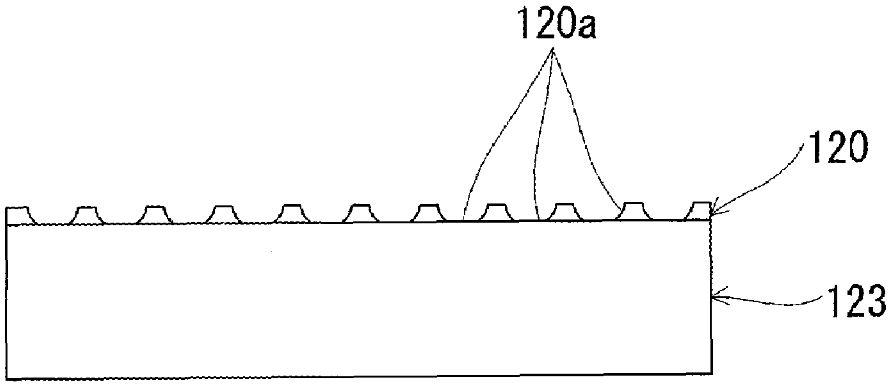
FIG. 6 is a sectional view showing a third embodiment of the coating film.

In FIG. 6, a substrate 123 made of an oil-repellent component forms the throttle body 101 having the bore 102 and the throttle valve 104. A coating film 120 made of a lipophilic component is formed on the facing surface 102*a* of the bore 102 and on the outer peripheral end surface 104*a* of the throttle valve 104.

The coating film 120 (third embodiment of the coating film) shown in FIG. 6 is formed in the following manner. First, the coating film 120 made of a lipophilic component is formed on the surface of the substrate 123 made of an oil-repellent component. Then, a plurality of grooves 120*a* are formed parallel to each other on the surface of the coating film 120, such that the surface of the substrate 123 is exposed at the grooves 120*a*. The grooves 120*a* are formed, for example, by the above-described femtosecond laser processing. In this arrangement, the surface of the substrate 123 and the coating film 120 form the surface which has a indented pattern. Specifically, the surface on which the oil-repellent component of the substrate 123 and the lipophilic component of the coating film 120 are dispersed is formed. Thus, the repelling power of the oil-repellent component of the substrate 123 and the attracting power of the lipophilic component of the coating film 120 act upon oil drops on the surface at all times.

The substrate 123 and the coating film 120 are features that correspond to the "substrate made of an oil-repellent component" and the "coating film made of a lipophilic component", respectively, according to the present invention.

FOURTH EMBODIMENT OF THE COATING FILM

Figure 7:
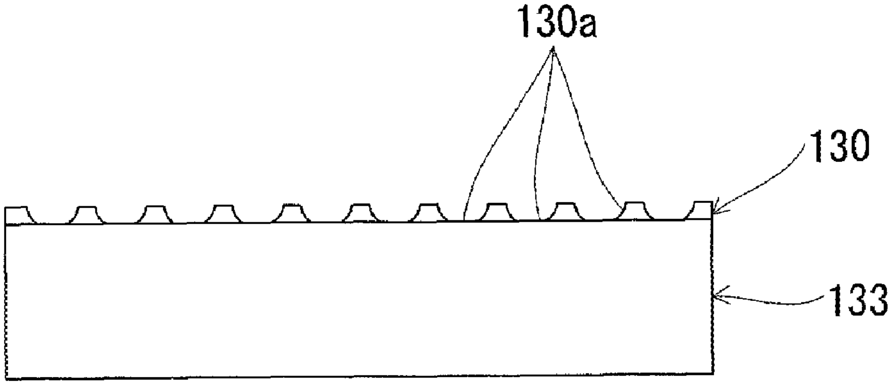
FIG. 7 is a sectional view showing a fourth embodiment of the coating film.

In FIG. 7, a substrate 133 made of a lipophilic component forms the throttle body 101 having the bore 102 and the throttle valve 104. A coating film 130 made of an oil-repellent component is formed on the facing surface 102*a* of the bore 102 and the outer peripheral end surface 104*a* of the throttle valve 104.

The coating film 130 (fourth embodiment of the coating film) shown in FIG. 7 is formed in the following manner. First, the coating film 130 made of an oil-repellent component is formed on the surface of the substrate 133 made of a lipophilic component. Then, a plurality of grooves 130*a* are formed parallel to each other on the surface of the coating film 130, such that the surface of the substrate 133 is exposed at the grooves 130*a*. The grooves 130*a* are formed, for example, by the above-described femtosecond laser processing. In this arrangement, the surface of the substrate 133 and the coating film 130 form the surface which has a indented pattern. Specifically, the surface on which the lipophilic component of the substrate 133 and the oil-repellent component of the coating film 130 are dispersed is formed. Thus, the attracting power of the lipophilic component of the substrate 133 and the repelling power of the oil-repellent component of the coating film 130 act upon oil drops on the surface at all times.

The substrate 133 and the coating film 130 are features that correspond to the "substrate made of a lipophilic component" and the "coating film made of an oil-repellent component", respectively, according to the present invention.

Preferably, like the grooves 110*a* of the first and second embodiment, the grooves 120*a* of the third embodiment and the grooves 130*a* of the fourth embodiment may have a circular-arc section, having a depth of 100 to 400 nm, a width (in the lateral direction as viewed in FIG. 4) of 100 to 800 nm, and surface roughness of about 0.7 μm.

Further, as the oil-repellent component of the substrates 123 and the coating films 130, fluorine resins, such as tetrafluoroethylene copolymer (TEFC), polytetrafluoroethylene (PTFE) and perfluoroalkoxyalkane (PFA) can be used. As the lipophilic component of the substrates 133 and the coating films 120, silicone resin (such as denatured organo polysiloxane), inorganic silicon oxide ($SiO_2$), methyl group modified polymer (such as polypropylene (PP)), metal (such as nickel, cobalt, manganese) and metal oxide can be used.

Although, in the third embodiment, the substrate 123 made of a oil-repellent component and the coating film 120 made of an lipophilic component form the surface, a coating film made of an oil-repellent component and a coating film made of a lipophilic component may form the surface. For example, a coating film (inner coating film) made of an oil-repellent component is formed on the surface of the substrate 123, and then a coating film (outer coating film) made of a lipophilic component is formed on the surface of the coating film (inner coating film) made of an oil-repellent component. Specifically, two coating films are formed in layer on the surface of the substrate 123. Further, a plurality of the grooves 120*a* are formed on the surface of the coating film (outer coating film) made of a lipophilic component such that the surface of the coating film (inner coating film) made of an oil-repellent component is exposed at the grooves 120*a*. In this arrangement, the inner coating film made of an oil-repellent component corresponds to the substrate 123 of the third embodiment, and the outer coating film made of a lipophilic component corresponds to the coating film 120 of the third embodiment.

The fourth embodiment can also be modified in a similar manner. Specifically, a coating film (inner coating film) made of a lipophilic component and a coating film (outer coating film) made of an oil-repellent component are formed on the surface of the substrate 133. Then, a plurality of the grooves 130*a* are formed on the surface of the coating film (outer coating film) made of an oil-repellent component such that the surface of the coating film (inner coating film) made of a lipophilic component is exposed at the grooves 130*a*. In this arrangement, the inner coating film made of a lipophilic component corresponds to the substrate 133 of the fourth embodiment, and the outer coating film made of an oil-repellent component corresponds to the coating film 130 of the fourth embodiment.

Also in the third and fourth embodiments, the surface area is increased by forming the grooves 120*a* or 130*a* in the coating film 120 or 130. Therefore, like in the first and second embodiments, the oil sliding property of the coating film can be improved. Particularly in the third and fourth embodiments, the coating film made of either an oil-repellent component or a lipophilic component can be used. Therefore, the cost of the coating agent can be reduced.

In the third and fourth embodiments, oil-repellent components and lipophilic components are alternately arranged in stripes on the surface, so that oil drops can be controlled to slide (move) on the surface in a certain direction. This will be described in further detail with reference to FIG. 8, which is a plan view of the third embodiment.

Figure 8:
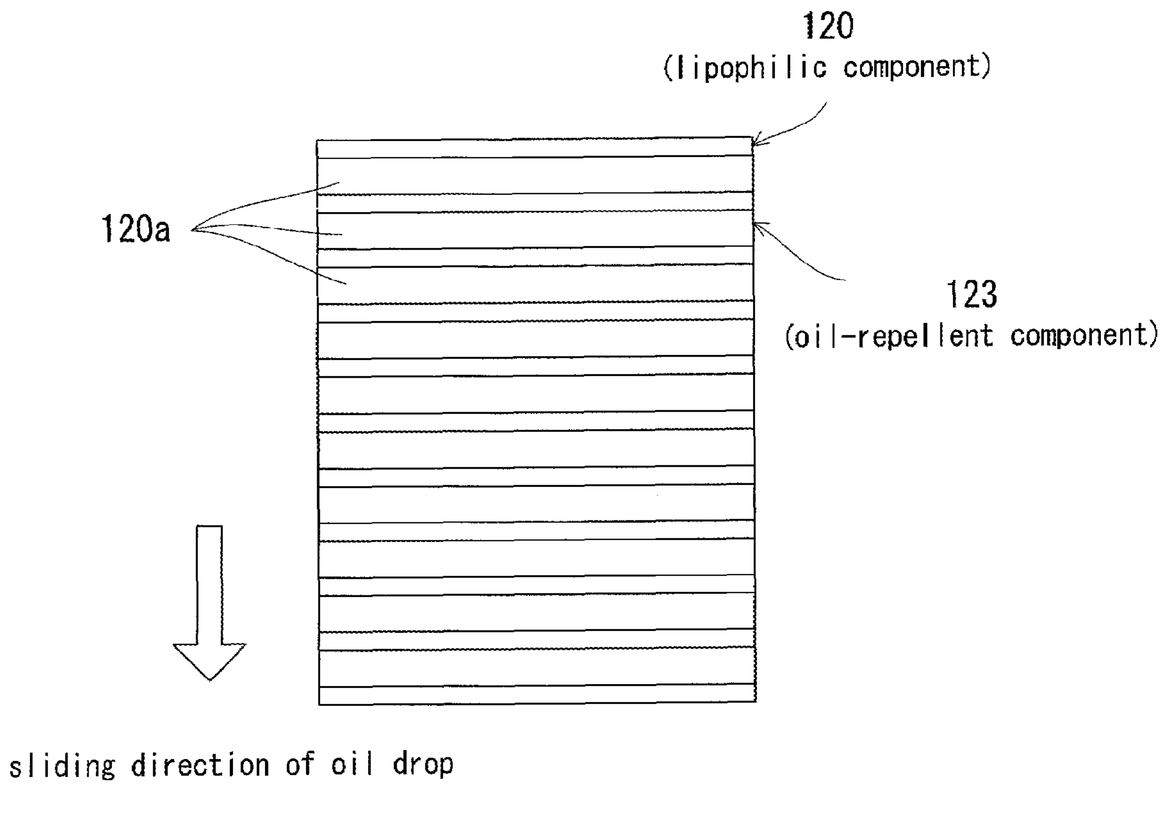
FIG. 8 is a sectional view showing a fifth embodiment of the coating film.

As shown in FIG. 8, in the third embodiment, the substrate 123 made of the oil-repellent component and the coating film 120 made of the lipophilic component are arranged in alternate stripes on the surface. With this arrangement, the sliding direction (moving direction) of oil drops can be controlled in a direction that intersects with the extending direction (longitudinal direction) of the grooves 120*a*. Preferably, the sliding direction of oil drops can be controlled in a direction perpendicular to the extending direction of the grooves. Further, the grooves 102*a* formed by laser processing such as femtosecond laser processing has a high plateau rate. Therefore, the oil-drop sliding property of the grooves 102*a* can be improved, compared with grooves formed by polishing processing and having the same surface roughness. The same effect can also be obtained in the fourth embodiment.

The present invention is not limited to the constructions that have been described as the representative embodiments, but rather, may be added to, changed, replaced with alternatives or otherwise modified without departing from the spirit and scope of the invention.

Each of the constructions described in the embodiments can be used separately or in combination of appropriately selected ones of them. Although, in the embodiments, the grooves 110, 120*a*, 130*a* have a circular-arc section, the grooves can be designed in various sectional shapes, such as elliptic, rectangular, triangular and polygonal shapes. Although, in the embodiments, a plurality of the parallel grooves are formed in order to provide the indented pattern surface of the coating film, any recesses can be applied in place of the grooves. The shape of the recesses can be appropriately selected. Further, the recesses may be shaped such that the substrate laid under the coating film or another (inner) coating film laid under the (outer) coating film is exposed at the recesses. The oil sliding property can also be improved with a coating film having recesses formed in the surface thereof. Although the intake apparatus 100 for controlling the amount of air to be supplied to the internal combustion engine has been described in the above embodiments, the technique disclosed in the present invention can also be applied to various kinds of fluid flow control devices for controlling the flow rate of fluid for the internal combustion engine, such as an exhaust gas recirculation apparatus (EGR) to be installed in an exhaust path, an engine valve, a swirl control valve, and an injector injecting section. Further, the technique disclosed in the present invention can be applied to various kinds of internal combustion engines, including a gasoline engine and a diesel engine.

What we claim is:

1. A fluid flow control device for an internal combustion engine, including a fluid passage defined by an inner peripheral surface, through which fluid for the internal combustion engine flows, and a valve that opens and closes the fluid passage, the valve having an outer peripheral surface and being rotatably supported within the fluid passage, wherein:

a coating film in which a lipophilic component and an oil-repellent component are dispersed is formed on at least one of a portion of the inner peripheral surface of the fluid passage which faces the valve and a portion of the outer peripheral surface of the valve which faces the inner peripheral surface of the fluid passage.

2. The fluid flow control device as defined in claim 1, wherein, in the coating film, silicone resin which is a lipophilic component and fluorine resin which is an oil-repellent component are dispersed.

3. The fluid flow control device as defined in claim 1, wherein the fluid passage comprises an air passage through which air is supplied to the internal combustion engine, and the valve comprises a throttle valve that opens and closes the fluid passage.

4. The fluid flow control device as defined in claim 1, wherein a plurality of recesses are formed in the surface of the coating film.

5. The fluid flow control device as defined in claim 4, wherein the recesses have a circular-arc section.

6. The fluid flow control device as defined in claim 4, wherein the recesses have a depth of 100 to 400 nm, and a width of 100 to 800 nm.

7. A fluid flow control device for an internal combustion engine, including a fluid passage through which fluid for the internal combustion engine flows, and a valve that opens and closes the fluid passage, wherein:

a substrate made of an oil-repellent component forms at least one of a portion of an inner peripheral surface of the fluid passage which faces the valve and a portion of an outer peripheral surface of the valve which faces the inner peripheral surface of the fluid passage, on which a coating film made of a lipophilic component is formed, and a plurality of recesses are formed in the surface of the coating film such that the substrate is exposed at the surface.

8. The fluid flow control device as defined in claim 7, the plurality of the recesses have a circular-arc section.

9. The fluid flow control device as defined in claim 7, wherein the recesses have a depth of 100 to 400 nm, and a width of 100 to 800 nm.

10. The fluid flow control device as defined in claim 7, wherein said fluid passage comprises an air passage through which air is supplied to the internal combustion engine, and said valve comprises a throttle valve that opens and closes the fluid passage.

11. The fluid flow control device as defined in claim 7, wherein the plurality of the recesses extend parallel to each other.

12. The fluid flow control device as defined in claim 11, wherein the fluid flows in a direction that intersects with an extending direction of the recesses.

13. A fluid flow control device for an internal combustion engine, including a fluid passage through which fluid for the internal combustion engine flows, and a valve that opens and closes the fluid passage, wherein:

a substrate made of a lipophilic component forms at least one of a portion of an inner peripheral surface of the fluid passage which faces the valve and a portion of an outer peripheral surface of the valve which faces the inner peripheral surface of the fluid passage, on which a coating film made of an oil-repellent component is formed, and a plurality of recesses are formed in the surface of the coating film such that the substrate is exposed at the surface.

14. The fluid flow control device as defined in claim 13, the plurality of the recesses have a circular-arc section.

15. The fluid flow control device as defined in claim 13, wherein the recesses have a depth of 100 to 400 nm, and a width of 100 to 800 nm.

16. The fluid flow control device as defined in claim 13, wherein said fluid passage comprises an air passage through which air is supplied to the internal combustion engine, and said valve comprises a throttle valve that opens and closes the fluid passage.

17. The fluid flow control device as defined in claim 13, wherein the plurality of the recesses extend parallel to each other.

18. The fluid flow control device as defined in claim 17, wherein the fluid flows in a direction that intersects with an extending direction of the recesses.

* * * * *